Oct. 30, 1956   D. B. GARDINER ET AL   2,768,699
HYDRAULIC POWER STEERING WITH BY-PASS VALVE
Filed Dec. 8, 1952

*INVENTORS*
DUNCAN B. GARDINER
HENRY C. PARSONS
THEODORE VAN METER
BY
ATTORNEY.

United States Patent Office 2,768,699
Patented Oct. 30, 1956

2,768,699

HYDRAULIC POWER STEERING WITH BY-PASS VALVE

Duncan B. Gardiner, Detroit, Henry C. Parsons, Grosse Pointe, and Theodore Van Meter, Oak Park, Mich., assignors to Vickers Incorporated, Detroit, Mich., a corporation of Michigan Application December 8, 1952, Serial No. 324,714

7 Claims. (Cl. 180—79.2)

This invention relates to power transmissions, and is particularly applicable to those of the type comprising two or more fluid pressure energy translating devices, one of which may function as a pump and another as a fluid motor.

The invention is generally concerned with combined manually operated and hydraulic power systems for steering the dirigible wheels of a vehicle. In particular, the invention is concerned with combined systems of the type recited wherein the hydraulic power transmission includes a fluid motor and follow-up control valve.

In many power steered vehicles conditions are encountered which lead to unwanted shimmy and chatter. Since a power steering system is essentially a servo system, tendencies to hunt or self-oscillate may be present which if not restrained lead to an unsatisfactory installation.

It is therefore an object of this invention to provide an efficient, economical, and long-lived, combined manually operated and hydraulic power system for steering the dirigible wheels of a vehicle.

It is a further object of this invention to provide in such a combined system means to substantially alleviate and eliminate chatter and shimmy conditions arising from road shocks imparted to the system.

It is also an object of this invention to provide in systems of the type immediately before recited, a hydraulic power transmission system which in addition to substantially alleviating and eliminating the unfavorable condition of chatter and shimmy will, in the case of power failure, not only permit manual operation of the steering system, but will lessen the manual force required of the operator.

It is another object of this invention to provide in such a combined steering system bypass means within the hydraulic transmission portion of the system associated with and cooperating in a novel way with the chatter and shimmy alleviating means which remains ineffective during normal operation of the system and which automatically becomes effective in case of power failure to permit manual steering of the dirigible wheels.

Further objects and advantages of the present invention will be apparent from the following description, reference being had to the accompanying drawing wherein a preferred form of the present invention is clearly shown.

Figures 1, 2:
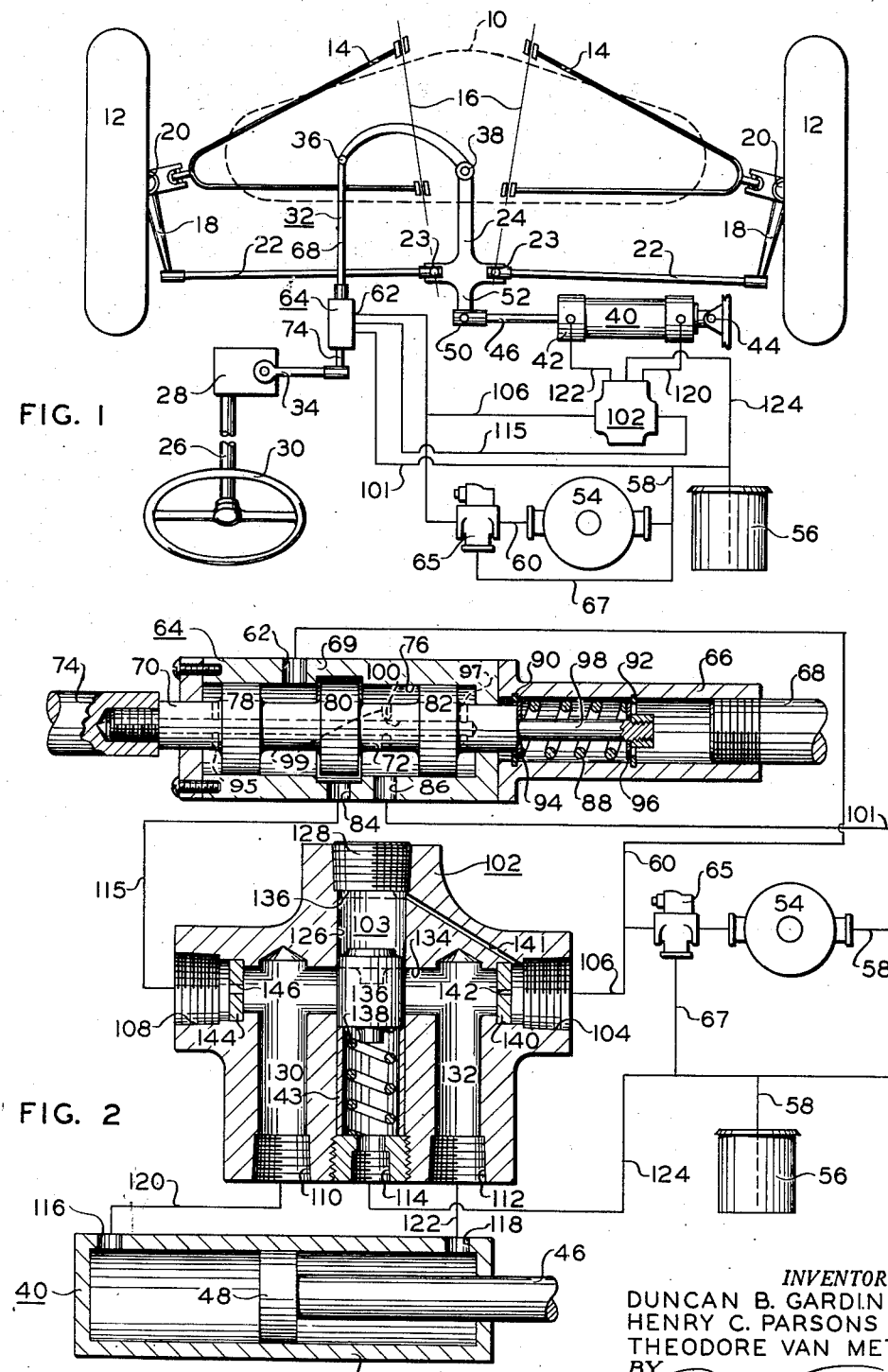
Figure 1 is a schematic diagram of a combined manually operated and hydraulic power steering system embodying a preferred form of the present invention.
Figure 2 is a schematic diagram of the hydraulic power transmission portion of the combined system shown in Figure 1 illustrating in section some of the components of the hydraulic power system.

Referring now to Figure 1, there is shown a vehicle front cross frame member indicated by the dotted line 10, the independently sprung dirigible wheels 12 of which are supported by wishbone links 14 which are pivotally connected to the vehicle frame on the axes 16. The usual knuckle arms 18 are provided for turning the wheels about the knuckle axis 20 to steer the vehicle. Tie rods 22 are connected at one end thereof to the knuckle arms 18, and are jointed at their other ends indicated by the numeral 23 to a bell crank member indicated generally by the numeral 24. There is also provided a conventional steering column 26 extending from gear 28 to a driver-controlled wheel 30. A drag link indicated generally by the numeral 32 interconnects a pitman arm 34 associated with gear 28 to one end of the bell crank member 24 at 36. The bell crank member 24 is pivotally connected to the frame at 38.

Referring to Figures 1 and 2 for the purpose of power steering the dirigible wheels, there is provided a hydraulic power transmission system including a double-acting fluid motor 40. The body of the motor 40 comprises a cylinder 42 which is fastened to the frame of the vehicle at 44. A piston rod 46 extending from the cylinder 42 and operatively associated with a piston 48 reciprocably mounted within the cylinder is connected at 50 to an arm 52 of the bell crank member 24.

The motor 40 is energized by a fluid pump 54 which may be driven from the engine of the vehicle, not shown. The inlet side of the pump 54 is connected to a reservoir 56 by a supply conduit 58, and the outlet side is connected by a pressure supply conduit 60 to a pressure port 62 of a control valve indicated by the numeral 64. A suitable relief valve 65 is incorporated in the pressure conduit 60 which is adapted to protect the system from excessive pressure by exhausting the same to reservoir 56 by means of a relief conduit 67.

The control valve 64 is interposed in the drag link 32 to provide a follow-up action of the control valve in the well known manner. As shown in Figure 2, the body member 69 of the control valve 64 is threadably connected at one end 66 thereof to an arm 68 of the drag link 32, and a stem 70 of a control piston 72, the former of which extends from the opposite end of the body, is threadably connected to another arm 74 of the drag link 32. The control piston 72 which is reciprocably mounted within a bore 76 of the body 69 is provided with three spaced-apart lands 78, 80, and 82 which control communication between the pressure port 62, and operating port 84, and a tank port 86.

The control piston 72 is biased to the neutral or center position shown by a spring 88. Two spaced-apart rings 90 and 92 are mounted in the smaller end of the bore 76 which act as abutments for spring spacer retainers 94 and 96, slidably mounted on a stem portion 98 of the control piston 72.

The opposite ends of the control piston 72 are vented to tank by means of a longitudinal passage 100 and three transverse passages 95, 97, and 99 within the control piston 72. The transverse passages 95 and 97 connect the ends of the large portions of bore 76 to the longitudinal passage 100, and the transverse passage 99 serves to continuously connect the longitudinal passage 100 to the tank port 86. The tank port 86 is connected to the reservoir 56 by a branch conduit 101 leading to the supply conduit 58.

Located in the hydraulic system between the control valve 64 and the motor 40 is a manifold block 102 incorporated within which is a pressure responsive bypass valve indicated generally by the numeral 103. The by-pass valve is adapted, in case of power failure, to connect the opposite ends of the motor together in a manner to ease the manual steering effort as will be subsequently explained in detail.

The manifold 102 is provided with a pressure port 104 connected to the pressure supply conduit 60 by a branch conduit 106, and is also provided with three operating ports 108, 110, and 112, and a tank port 114. The operating port 108 is connected to the operating port 84 of the control valve 64 by a conduit 115, and the operating ports 110 and 112 are respectively connected to opposite end ports 116 and 118 of motor 40 by means of motor conduits 120 and 122. The tank port 114 is connected to the supply conduit 58 leading to reservoir 56 by means of a conduit 124.

The manifold block 102 is also provided with a centrally located bore 126 within which the bypass valve mechanism 103 is mounted. The bore 126 is closed at one end by a plug 128 and is open at its other end, constituting tank port 114. Located parallel to and on opposite sides of bore 126 are two passages 130 and 132 which are closed at one end and open at their opposite ends, respectively, constituting motor ports 110 and 112. A passage 134 extends completely through the block 102 transversely to and intersecting bore 126 and passages 130 and 132. The bypass valve 103 comprises a piston 136 mounted within bore 126 which in event of power failure is biased by a spring 138 of light resistance to a position (shown in dotted line) opening transverse passage 134 to passages 130 and 132 so as to connect the opposite ends of the motor 40 to each other.

During normal operation of the system, however, either with control valve 64 in the neutral position or shifted to either side of neutral to a power steering position, the piston 136 will be maintained in the closed bypass position shown, by pressure fluid delivered to the upper end of bore 126 by means of a cross passage 141 which interconnects pressure port 104 of the manifold 102 to the upper end of the bore. The means for creating pressure immediately ahead of the operating side of the piston 136 in order to shift the piston 136 against the slight spring bias will be explained in detail hereafter. The movement of piston 136 to a fully closed position is limited by a sleeve 143 mounted in bore 126.

The hydraulic power steering system described in detail hereto, excluding the bypass valve arrangement, comprises a three-way valve and 2:1 differential motor system. The delivery side of the pump 54 is connected not only to the pressure port 62 of the three-way control valve 64, but is also continuously connected to the smaller displacement side, or rod end of motor 40. The operating port 84 of control valve 64 is connected directly to the large or head end of motor 40. The control valve 64 in its neutral position connects the pump 54 to reservoir 56 and both ends of the motor 40 to each other and to reservoir 56. In this type of system, in case of power failure, the dirigible wheels may be manually steered, and in such case the control valve becomes an essential part of the drag link. Some lost motion is suffered until the control piston is shifted to an abutting position against the end wall of the valve body, and then the control piston and body shift together as a component part of the drag link to operate the dirigible wheels of the vehicle. During normal operation, when the steering wheel 30 is turned to operate the valve 64, in one position of the valve, pump delivery is connected to both ends of the motor and the motor shifts rightwardly due to the differential areas involved. In the other operating position of the control valve, the head end of the motor is connected to the reservoir and the motor is operated in the leftward direction. It should be noted that substantially the same results may be obtained by the use of a four-way valve and a motor of less differential displacement value.

For the purpose of convenience there has been illustrated a hydraulic power steering system of the split type, i. e., a system wherein the follow-up control valve is separate from or located remotely from the motor. The present invention, however, is also adapted to alleviate chatter and shimmy in other types of systems wherein the control valve is integral with the motor. One reason advanced for the chatter and shimmy is that the dirigible wheels in being subjected to road shocks, impart the shocks to the fluid motor and also through the linkage to the control valve. In such case the motor is operated slightly and fluid must be immediately displaced and replaced at opposite ends of the motor. This, together with the linkage to the control valve, including in some cases the lost motion therein, causes the same to shift and tend to correct the condition. There is thus created a tendency to hunt or oscillate.

The chatter and shimmy recited may be substantially alleviated and eliminated by incorporating a restriction in one of the motor conduits, preferably in close proximity to the motor.

Instead of incorporating the conventional motor conduits in the system, it has been deemed convenient to incorporate a portion of the motor conduits in the manifold block 102 disclosed in Figure 2. Although a restriction or restrictions could be placed in the motor conduits 120 and/or 122, or the conduits 106 and/or 115, it has also been deemed more convenient to place the restrictions in the motor conduits extending through the manifold block 102. Thus, a plug 140 having a restriction 142 is stationarily mounted in the pressure port 104 of manifold block 102 and another plug 144 having a restriction 146 is mounted in the operation port 108 of the same block. The size of the restriction 142 is predetermined to provide a sufficient damping action of the motor to road shocks and to also substantially dampen the transfer of said shocks to the control valve. The area of the restriction 142 is also predetermined to create a pressure ahead of the operating side of the bypass piston 136 sufficient to overcome the slight resistance of spring 138 in order to normally maintain the bypass closed. Where two separate restrictions are utilized, the areas of the two restrictions are predetermined by the displacement they are adapted to handle from the ends of the motor near which they are located. It should be understood that flexible conduits will be incorporated in the system where needed.

In operation, when the steering wheel 30 is turned to shift the control piston 72 leftwardly, pressure port 62 of the control valve is blocked by land 80 from the operating port 84, and as the pump 54 is continuously connected to the rod end of motor 40, the motor will be operated in a leftward directional movement as illustrated in Figure 2 to correspondingly actuate the dirigible wheels. Pressure fluid is directed to the rod end of motor 40 by means of pressure delivery conduit 60, branch conduit 106, pressure port 104, restriction 142, passage 132, and operating port 112 of manifold 102, and motor conduit 122. Displacement from the head end of motor 40 is returned to the reservoir by means of motor conduit 120, operating port 110, passage 130, restriction 146, and operating port 108 of manifold 102, conduit 115, operating port 84, and tank port 86 of control valve 84, and the conduits 101 and 58. When the turning movement of steering wheel 30 ceases and the body of the control valve has been shifted by the linkage in a follow-up action so that the control valve 64 is again in its neutral position shown in Figure 2, the complete delivery of the pump 54 is routed to reservoir 56 by means of pressure delivery conduit 60 through the control valve 64 by means of pressure port 62 and tank port 86, and conduit 101 and 58.

If the steering wheel 30 is turned to shift the control piston 72 rightwardly, pressure fluid is simultaneously directed to both ends of motor 40. The motor 40 is then operated in a rightward directional movement as illustrated in Figure 2. The route of pressure fluid from the pump is via conduit 60, ports 62 and 84 of control valve 64, conduit 115, operating port 108, restriction 146, passage 130 and operating port 110 of manifold 102 and conduit 120. Fluid displaced from the rod end of motor 40 is added to the delivery of the pump being conducted to the head end of motor 40 via conduit 122, operating port 112, passage 132, restriction 142, and port 104 of manifold 102, and conduit 106 where it joins the pump delivery. When the turning of the wheel 30 ceases, the control valve 64 will again be returned to its neutral position.

As it is desired to maintain the bypass valve 103 in the closed position at all times except during power failure, it is necessary, while the control valve 64 is in a neutral position, to maintain some slight pressure in the conduit 60 which may be transferred through conduit 106, pressure port 104 of block 102 and cross passage 141 to the upper end of bore 126. It is conventional practice to incorporate in hydraulic power transmission systems for power steering the dirigible wheels of a vehicle either three or four-way directional control valves that are of the open center type. However, it is also conventional to provide in the valve, means, such as a properly designed land to port relationship, which will create some restriction to flow in its neutral position, i. e., the valve is not completely or fully open in its neutral position. This has been found through experience to aid in stabilizing such systems. Thus it is not necessary to provide a specially designed valve for the system disclosed, but a conventional three-way valve may be utilized that provides some slight restriction to fluid flow in its centered or neutral position.

It can be clearly seen that if the bypass valve was not in the closed position when the control valve 64 was centered, that when the steering wheel was turned to shift the control piston 72, power steering could not take place until the bypass was closed. It is possible, therefore, to provide an open bypass in the neutral position of the control valve, but additional means would have to be provided to close the bypass before power steering could take place. The restriction 142, therefore, in addition to serving as a damping means to alleviate chattering or shimmy in power steering systems of the type recited, also serves to maintain sufficient pressure ahead of the bypass piston 136 while the control piston of valve 64 is in neutral position in order to maintain the piston 136 in the closed bypass position. Power steering is thus immediately available without extra means having to be provided to close the bypass.

When road shocks are met and the motor 40 tends to be slightly actuated, the restriction 142 being in close proximity to the motor will dampen said shock by restraining either the fluid which must be displaced from the rod end of the motor 40, or the fluid that must be replaced to the rod end of said motor because of an equal displacement from the head end of the motor. The reaction which would normally bet set up at the control valve 64 because of a shifting of the valve through the linkage followed by a speedy shifting back and forth of said valve to correct the condition which also contributes to chattering and shimmy of the dirigible wheels, is substantially alleviated. As previously stated, the addition of restriction 146 in the operating port 108 of the manifold 102 will give slightly improved results in some cases. The restriction 142 thus definitely dampens the reaction forces set up at the motor and which is transferred to the control valve.

In case of power failure and consequent loss of pressure in the system, the spring 138 of the bypass valve 103 shifts the piston 136 upwardly (as shown in dotted lines) to connect the passage 132 to the passage 130 by opening the transverse passage 134 to said passages. The restrictions 142 and 146 become completely ineffective during the manual steering operation because the opposite ends of the motor 40 are freely connected to each other through the open transverse or bypass passage 134. It can be clearly seen that if fluid to and from opposite ends of the motor had to be forced through the restrictions during manual steering operation that the force required for the steering would be greatly increased. The bypass valve, in automatically being operated to the open position upon power failure and causing said restrictions to become ineffective, thus lessens the manual steering effort required.

During manual steering, fluid displaced from the large end of motor 40 is directed to the rod end of the motor by means of motor port 116, conduit 120, operating port 110, bypass passages 130, 134, and 132, port 112, conduit 122, and motor port 118. Excessive fluid from the large end of the motor may be returned to the reservoir through the bore 126 of the bypass valve 103 and conduits 124 and 58. When the motor is operated rightwardly during manual steering, the displacement from the rod end of the motor is freely conducted to the head end of the motor 40 through the bypass valve, and the additional requirement for the head end of the motor is drawn from the reservoir 56 by means of conduits 58 and 124, ports 114, and bore 126 which is also connected to the head end of the motor.

There is thus provided a hydraulic power steering system that is capable of meeting the installation requirement of practically any vehicle having manually operated mechanism for steering the dirigible wheels of the vehicle. It is readily adaptable for meeting a variety of installation requirements.

The invention also substantially alleviates and eliminates the chatter and shimmy to which combined manually operated and hydraulic power steering systems have been susceptible. The means for stabilizing the system and eliminating the unfavorable conditions recited, which is a restriction or restrictions in the motor conduit or conduits, preferably in close proximity thereto, is inexpensive, trouble-free, and long-lived. The restriction also performs the double function of creating the slight pressure needed for maintaining the bypass valve in the closed position. The restriction also, without any other complicated valve or manually operated means, senses power failure in the system and becomes ineffective to permit the bypass valve to automatically open and connect the opposite ends of the motor to each other for manual steering purposes.

The restriction or restrictions are thus so connected in the system with the bypass valve that, although effective for serving a very useful purpose during power operation of the system, they become completely ineffective in case of power failure to lessen the manual steering effort required.

While the form of embodiment of the invention as herein disclosed constitutes a preferred form, it is to be understood that other forms might be adopted, all coming within the scope of the claims which follow.

What is claimed is as follows:

1. The combination with manually operated mechanism for steering the dirigible wheels of a vehicle of a double-acting fluid motor operatively associated with the dirigible wheels for power steering the same, a fluid pump for energizing the motor, a control valve mounted remotely from the motor and operatively associated with the steering mechanism and with the motor for selectively operating the motor with follow-up control, a fluid circuit interconnecting the pump, the valve, and the motor including conduits connected to opposite ends of the motor for conducting fluid to or from the motor depending upon its direction of operation, a damping restriction proximate to said motor and located between the control valve and the motor in one of said motor conduits, branch conduit means connecting the motor conduits to each other between the restriction and the motor and bypassing the restriction, and pressure responsive valve means normally closing the branch conduit means and automatically opening said conduit means upon power failure in the system.

2. In a steering system comprising manually operated mechanism for steering the dirigible wheels of a vehicle, a double-acting fluid motor of the differential type operatively associated with the dirigible wheels for power steering the same, a source of pressure fluid including a fluid pump for energizing the motor, a control valve operatively associated with the manually operated mechanism and with the motor for selectively operating the motor with follow-up control, and a fluid circuit interconnecting the pressure fluid source, the valve, and the motor, including two motor conduits leading to opposite ends of the motor, one of which connects the delivery side of the pump to the smaller displacement end of the motor, the combination of a damping restriction in the one motor conduit, means forming a bypass around the restriction, a pressure responsive valve for controlling the bypass, and a pressure control conduit leading from the one motor conduit ahead of the restriction to the pressure responsive valve, said valve maintaining the bypass closed during normal functioning of the hydraulic power portion of the combined system and opening said bypass around the restriction in response to power failure.

3. In a steering system comprising manually operated mechanism for steering the dirigible wheels of a vehicle, a double-acting fluid motor of the differential type operatively associated with the dirigible wheels for power steering the same, a source of pressure fluid including a fluid pump for energizing the motor, a control valve operatively associated with the manually operated mechanism and with the motor for selectively operating the motor with follow-up control, and a fluid circuit interconnecting the pressure fluid source, the valve, and the motor, including two motor conduits leading to opposite ends of the motor, one of which connects the delivery side of the pump to the smaller displacement end of the motor, the combination of a damping restriction in the one motor conduit, means forming a bypass around the restriction, and connecting both of the motor conduits to each other, a pressure responsive valve for controlling the bypass, and a pressure control conduit leading from the one motor conduit ahead of the restriction to the pressure responsive valve, said valve maintaining the by-pass closed during normal functioning of the hydraulic power portion of the combined system and connecting the opposite ends of the motor to each other around the restriction in response to power failure.

4. In a steering system comprising manually operated mechanism for steering the dirigible wheels of a vehicle, a double-acting fluid motor of the differential type operatively associated with the dirigible wheels for power steering the same, a source of pressure fluid including a fluid pump for energizing the motor, a control valve operatively associated with the manually operated mechanism and with the motor for selectively operating the motor with follow-up control, and a fluid circuit interconnecting the pressure fluid source, the valve, and the motor, including two motor conduits leading to opposite ends of the motor, one of which connects the delivery side of the pump to the smaller displacement end of the motor, the combination of a damping restriction in the one motor conduit, a branch conduit connecting the one motor conduit beyond the restriction to the other motor conduit, a bypass valve for controlling the branch conduit including means urging the valve to open position, and pressure operating means for closing the valve, and a pressure control conduit leading from the one motor conduit ahead of the restriction to the pressure operating means of the valve.

5. In a steering system comprising manually operated mechanism for steering the dirigible wheels of a vehicle, a double-acting fluid motor operatively associated with the dirigible wheels for power steering the same, a source of pressure fluid including a fluid pump for energizing the motor, a control valve operatively associated with the manually operated mechanism and with the motor for selectively operating the motor with follow-up control, and a fluid circuit interconnecting the pressure fluid source, the valve, and the motor, including two motor conduits leading to opposite ends of the motor, the combination of a damping restriction between the control valve and the motor in one of said motor conduits, means forming a by-pass around the restriction, a pressure responsive valve for controlling the by-pass, and a control conduit leading from the said one motor conduit ahead of the restriction to the pressure responsive valve, said valve maintaining the by-pass closed during normal functioning of the hydraulic power portion of the combined system and opening the said by-pass around the restriction in response to power failure.

6. In a steering system comprising manually operated mechanism for steering the dirigible wheels of a vehicle, a double-acting fluid motor operatively associated with the dirigible wheels for power steering the same, a source of pressure fluid including a fluid pump for energizing the motor, a control valve operatively associated with the manually operated mechanism and with the motor for selectively operating the motor with follow-up control, and a fluid circuit interconnecting the pressure fluid source, the valve, and the motor, including two motor conduits leading to opposite ends of the motor, the combination of a damping restriction between the control valve and the motor in one of the motor conduits, means forming a by-pass around the restriction and connecting both of the motor conduits to each other, a pressure responsive valve for controlling the by-pass, and a pressure control conduit leading from the one motor conduit ahead of the restriction to the pressure responsive valve, said valve maintaining the by-pass closed during normal functioning of the hydraulic power portion of the combined system and connecting the opposite ends of the motor to each other around the restriction in response to power failure.

7. In a steering system comprising manually operated mechanism for steering the dirigible wheels of a vehicle, a double-acting fluid motor operatively associated with the dirigible wheels for power steering the same, a source of pressure fluid including a fluid pump for energizing the motor, a control valve operatively associated with the manually operated mechanism and with the motor for selectively operating the motor with follow-up control, and a fluid circuit interconnecting the pressure fluid source, the valve, and the motor, including two motor conduits leading to opposite ends of the motor, the combination of a damping restriction between the control valve and the motor in one of the motor conduits, a branch conduit connecting the one motor conduit beyond the restriction to the other motor conduit, a by-pass valve for controlling the branch conduit including means urging the valve to open position and pressure operating means for closing the valve, and a pressure control conduit leading from the one motor conduit ahead of the restriction to the pressure operating means of the valve.

References Cited in the file of this patent

UNITED STATES PATENTS

| 2,022,698 | Vickers | Dec. 3, 1935 |
| 2,030,902 | Vickers | Feb. 18, 1936 |
| 2,069,540 | Sanford | Feb. 2, 1937 |
| 2,081,054 | Kenyon | May 18, 1937 |
| 2,432,721 | Brown | Dec. 16, 1947 |